June 3, 1930.                S. BRAND                1,761,651
                           CASH REGISTER
                        Filed Feb. 2, 1924        7 Sheets-Sheet 1

Inventor
Samuel Brand
By
His Attorneys

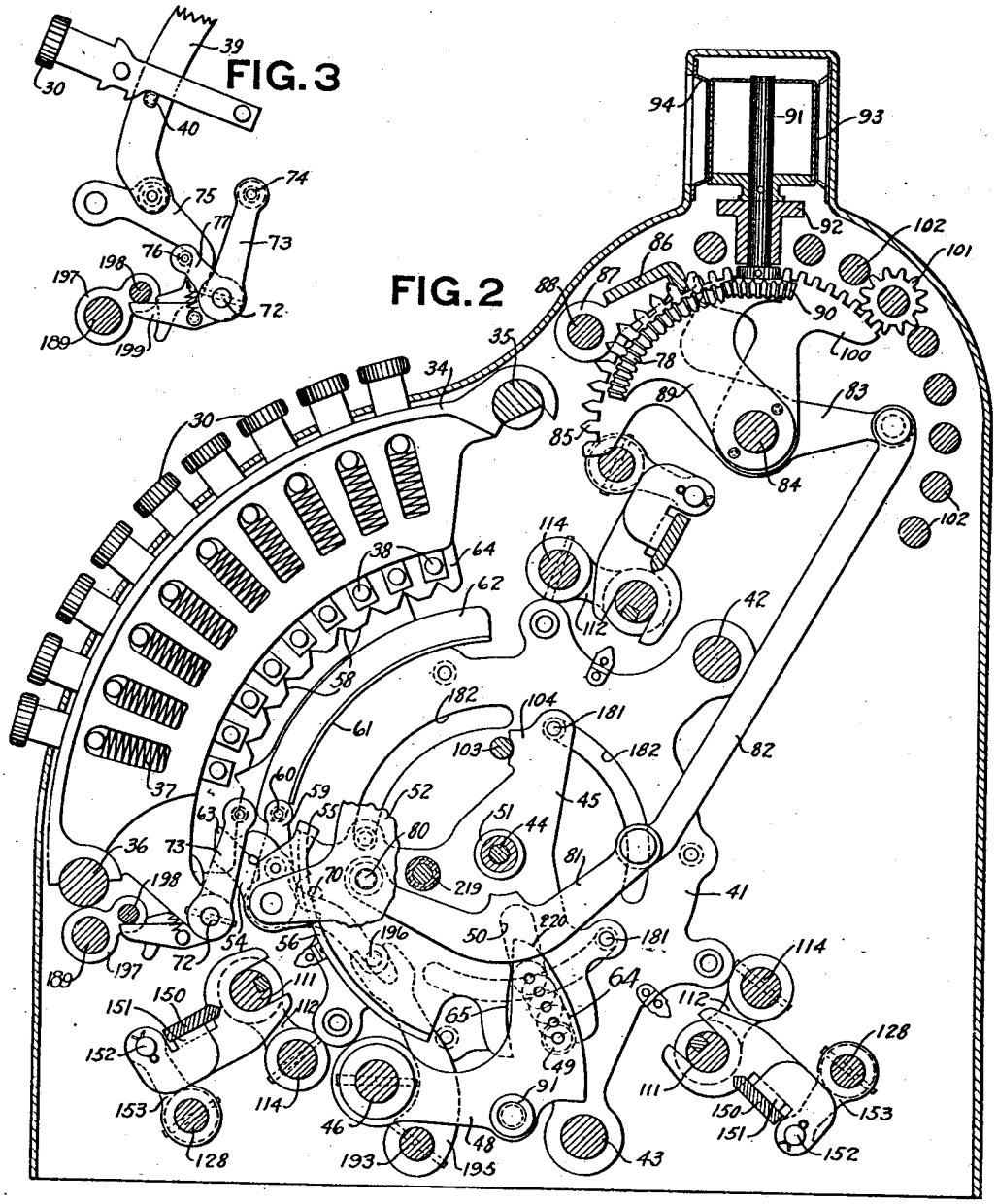

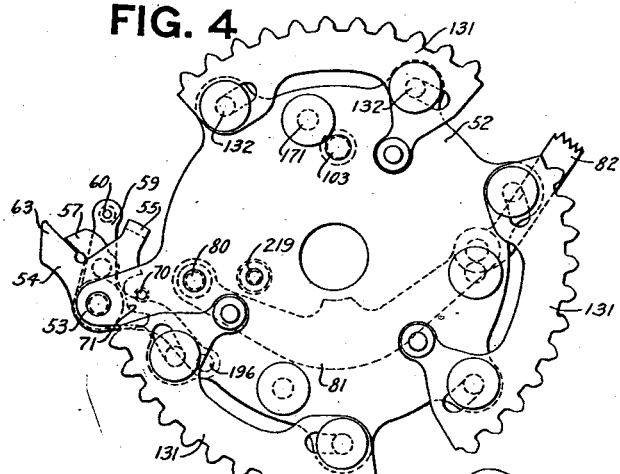
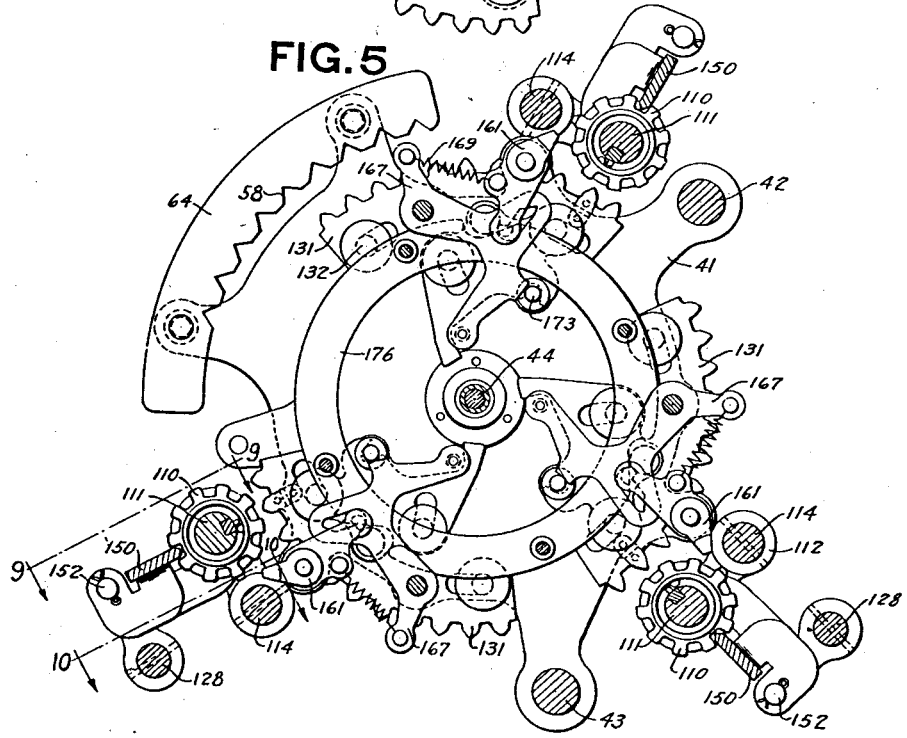

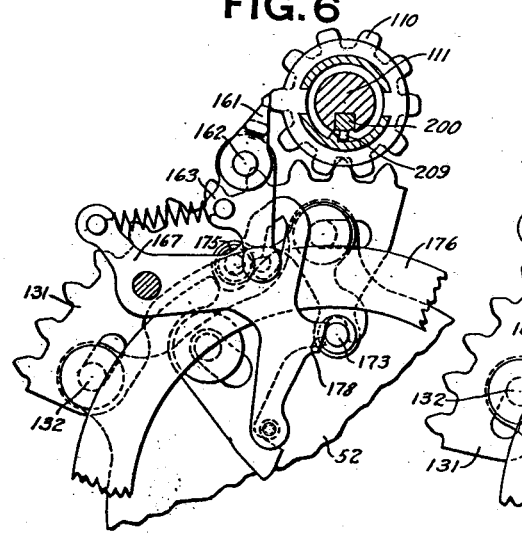
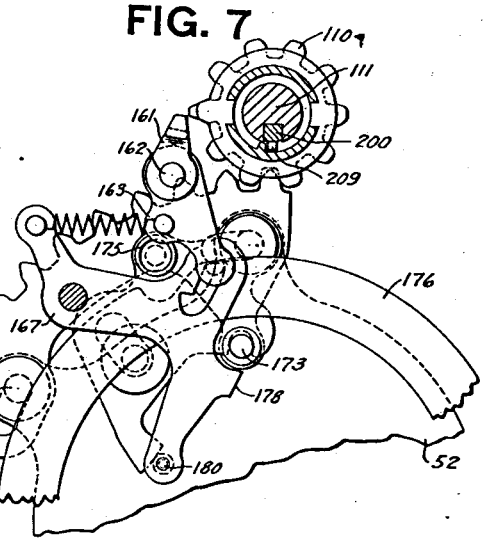
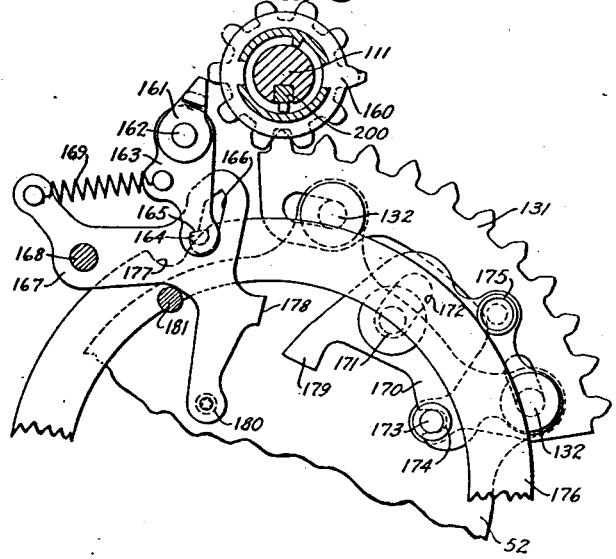

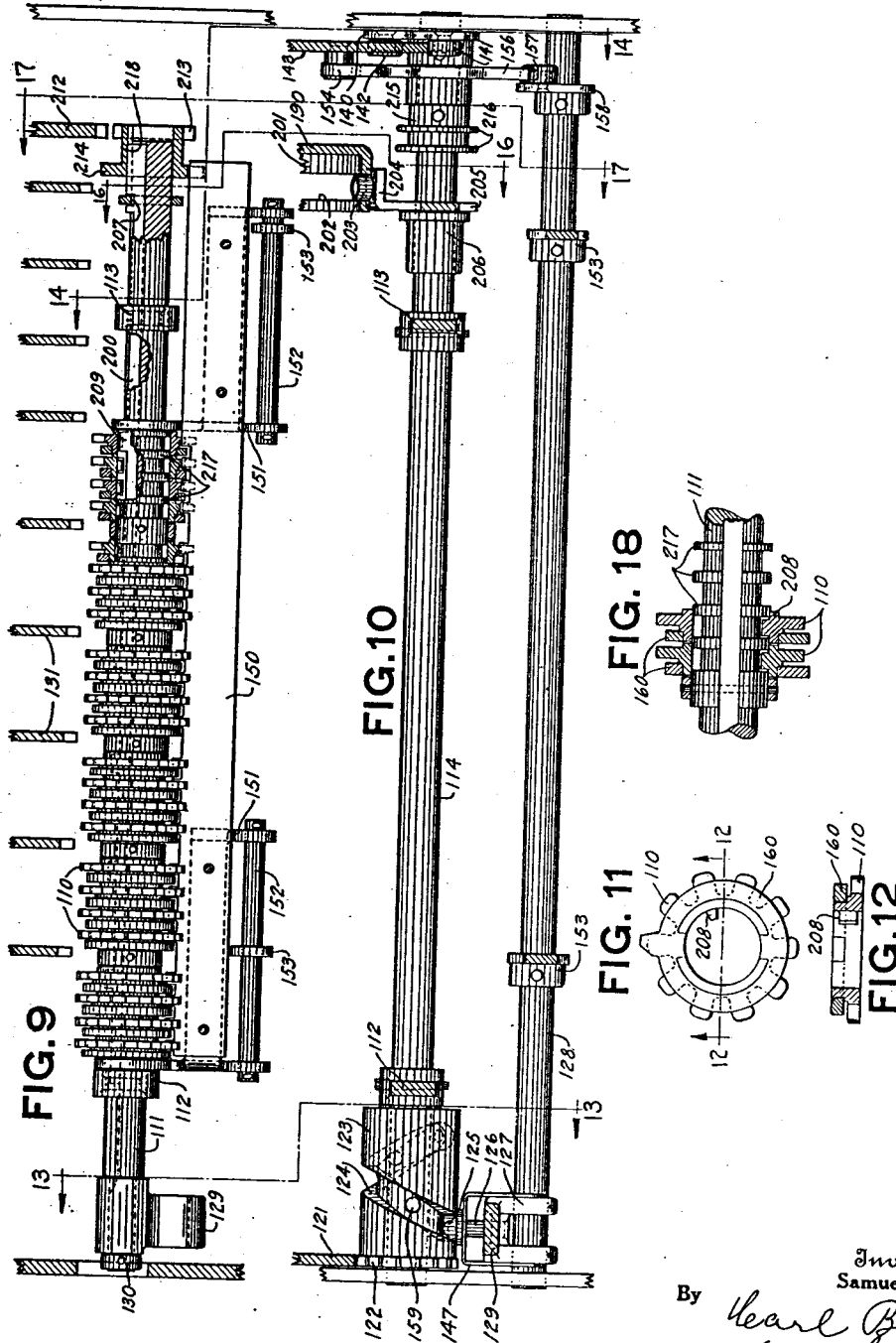

June 3, 1930.                S. BRAND                1,761,651
                           CASH REGISTER
                        Filed Feb. 2, 1924        7 Sheets-Sheet 6

Inventor
Samuel Brand
His Attorneys

June 3, 1930.                S. BRAND                1,761,651
                           CASH REGISTER
                      Filed Feb. 2, 1924        7 Sheets-Sheet 7
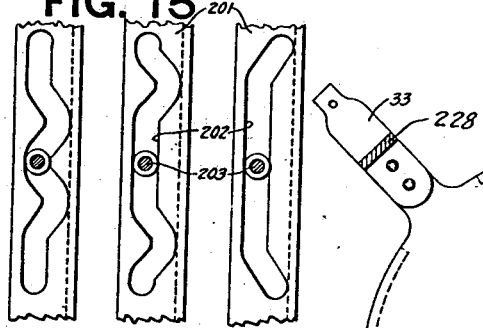
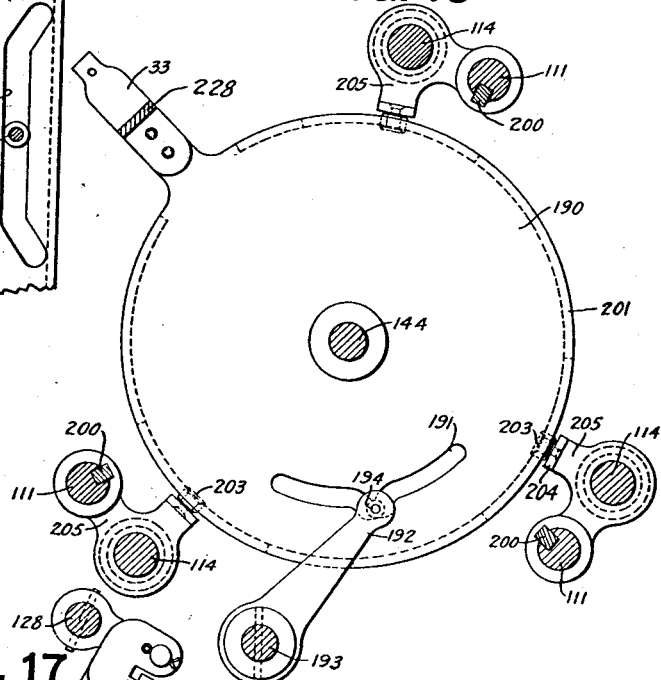
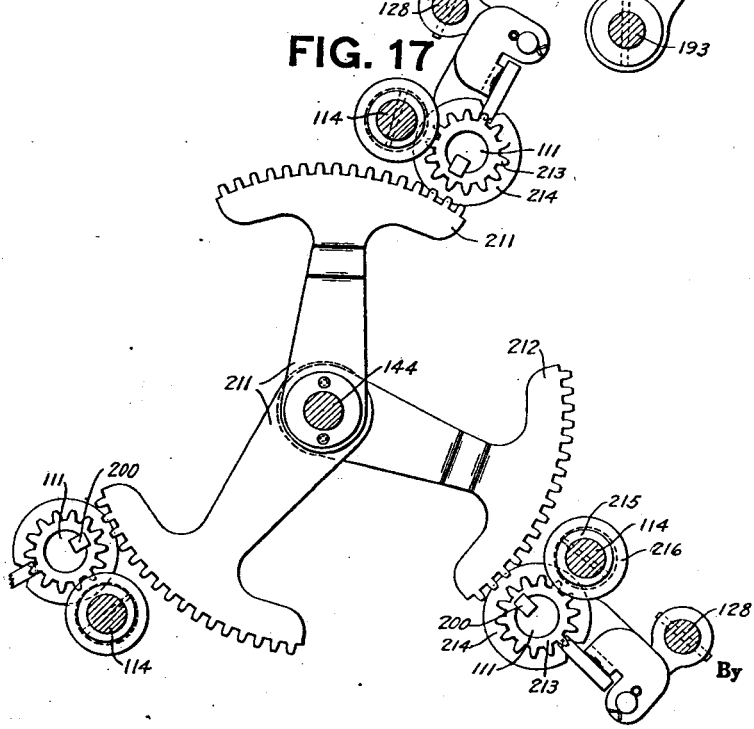
Inventor
Samuel Brand Patented June 3, 1930

1,761,651

UNITED STATES PATENT OFFICE

SAMUEL BRAND, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed February 2, 1924. Serial No. 690,239.

This invention relates to cash registers.

One object of this invention is to produce a small and inexpensive cash register for use in retail stores and the like.

Another object of this invention is to provide a machine of this type with a positively operated differential latch mechanism which will render the use of springs unnecessary therewith.

Another object is to provide a novel transfer mechanism.

With these and incidental objects in view, the invention includes certain novel features of construction and combinations of parts, the essential elements of which are set forth in appended claims and a preferred form or embodiment of which is hereinafter described with reference to the drawings which accompany and form part of this specification.

Of said drawings:

Fig. 2 is a sectional view taken through the machine just to the right of one of the amount banks, with certain parts omitted for the sake of clearness.

Fig. 3 is a detail side view of the means for moving the zero stop pawls to their ineffective positions.

Fig. 4 is a side elevation of the differentially movable member and the totalizer actuating segments carried thereby.

Fig. 5 is a sectional view showing the actuating segments and transfer mechanism in their relation to the actuators.

Fig. 6 shows one of the actuating segments and the transfer mechanism in the positions the parts will occupy when no transfer has been made.

Fig. 7 shows the same mechanism as Fig. 6, with the parts in the positions they will occupy when a transfer has been accomplished.

Fig. 8 shows the mechanism of Fig. 6 when the actuating segment has been moved to its farthest position under the control of the "9" key.

Fig. 9 is a plan view of one of the totalizer lines taken on the line 9—9 of Fig. 5.

Fig. 10 is a sectional view taken on line 10—10 of Fig. 5, looking in the direction of the arrows.

Fig. 11 is a detail side elevation of one of the totalizer elements.

Fig. 12 is a detail section taken on line 12—12 of Fig. 11.

Fig. 15 is a detail view of the three cam slots which control the key shifting mechanism on totalizing operations.

Fig. 16 is a side elevation of the total lever disk and the mechanism actuated thereby for shifting the resetting key.

Fig. 17 is a side view of the totalizer resetting mechanism.

Fig. 18 is a detail side elevation of a fragment of one of the totalizer shafts with two of the totalizer elements shown in section thereon.

Keyboard

Figure 1:
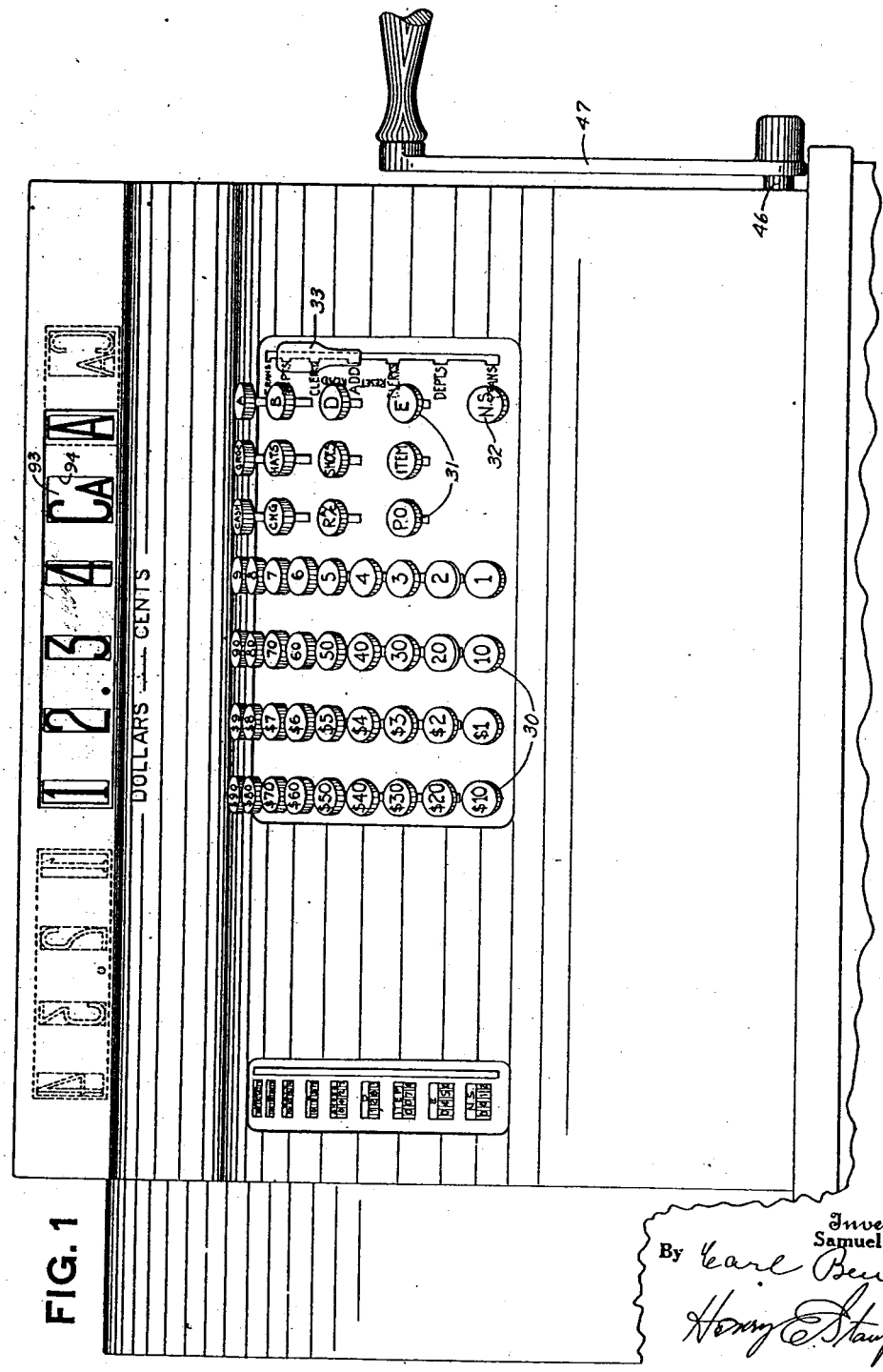
Fig. 1 is a front elevation of the machine.

The keyboard of this machine, as shown in Fig. 1, comprises four banks of amount keys 30, three banks of control keys 31, a No Sale key 32, and a total lever 33. The four banks of amount keys give the register a capacity of $99.99. The first bank of control keys, reading from right to left, is for clerks; the second bank is for departments; and the third bank is for transactions. As will be hereinafter described, each of the control keys has a corresponding totalizer selected by the depression of its key and upon which the amount set up on the amount keys will be added.

The construction of the banks of amount keys and the banks of control keys is substantially the same as that shown in the patent to F. L. Fuller, No. 1,394,256, issued Oct. 18, 1921. If desired, reference may be made to this patent for a full description of the key banks and their construction. In this application it is thought to be sufficient to say that the keys in each bank are slidably mounted in a key frame 34 (Fig. 2)

which is supported at its upper end by a rod 35 and at its lower end by a rod 36, both of said rods being supported by the side frames of the machine. The keys are held in their normal undepressed positions by springs 37 which co-operate with the key shanks. At their inner ends each of the keys carries a laterally projecting pin 38, the function of which will be hereinafter described. When a key is depressed it is held in its depressed position by a detent 39 (Fig. 3) which carries a plurality of pins 40 adapted to co-operate with shoulders on the keys and thereby hold the depressed key in its depressed position in a manner well known in machines of this type.

Differential mechanism

The differential mechanism for this machine is constructed in a series of units, and as these units are identical in their construction and operation it is thought that the description of one will be sufficient for all. Each of these differential units is supported by two hangers 41 (Fig. 2) carried by rods 42 and 43 supported by the machine side frames. Pivoted on a hub 51 supported by the hangers 41 is a segmental driver 45 (Fig. 2) adapted to receive an oscillatory movement, first clockwise and then counter-clockwise, on every operation. A rod 44 extends through all of the differential units and ties them together. The means for giving this driver 45 its oscillatory movement will now be described.

A crank handle 47 (Fig. 1) adapted to be pulled toward the operator and then returned to its normal position on every operation of the machine is provided, and this crank handle is connected by suitable mechanism to a shaft 46 (Fig. 2). Fast on the shaft 46 is an arm 48 which carries a roller 49 projecting into a slot 50 of the driver 45. The arms 48, one for each bank, are each provided with a plurality of holes for supporting studs for the rollers 49. There is only one roller 49 on each arm 48 and they are spaced successively from the upper end of the arm 48 in order to make the operation of the machine easier and to provide time for successive transfers as is well known in the art. It can be seen from Fig. 2 that when the shaft 46 and arm 48 are rocked counter-clockwise, the roller 49 will move upwardly in the slot 50. Approximately the first half of the upward movement of the roller 49 will have no effect upon the driver 45, as this part of the slot is formed with its edge 64 concentric with the shaft 46. As the roller continues its movement, however, it enters the upper end of the slot and causes the driver 45 to be rotated clockwise about the hub 44 until the roller 49 reaches its highest point in the slot. As the arm 48 continues its counter-clockwise movement, the roller 49 moves down the opposite side of the slot 50, thus continuing to move the driver 45 clockwise until the roller finally reaches an edge 65 which is also concentric with the shaft 46 when the driver 45 is in its farthest moved position, and therefore the driver 45 will remain in such position during the time the roller moves along the edge 65. The operating handle is then returned to its normal position and the action of the roller 49 in the slot 50 will return the driver 45 to the position shown in Fig. 2. These concentric edges 64 and 65 are provided because it is necessary for the arm 48 to move a greater distance than the driver 45.

Loosely mounted on a hub 51 of the driver 45 is a differentially movable disk 52 (Figs. 2 and 4). This disk is normally connected to the driver 45 by a latch 54 and is, therefore, moved with this driver until the latch is disconnected therefrom, whereupon the driver 45 continues its movement, leaving the differentially movable disk 52 in whatever position it had reached when the latch was disconnected. The differentially movable disk 52 has a projecting arm 53, upon which the latch mechanism is pivotally mounted. This latch mechanism consists of three members. The first of these is a two-armed latch 54, one arm of which has a lip 55 which normally lies just above a flange 56 (Fig. 2) formed on the driver 45. It is evident from Fig. 2 that, with the latch 54 in the position shown in this figure, the differentially movable disk 52 will be carried in a clockwise direction upon the movement of the driver 45 due to the connection between the flange 56 and the lip 55.

As the differentially movable disk is given this clockwise movement, a forwardly projecting nose 63 of the latch 54 will come into contact with the pin 38 carried by whichever one of the keys has been depressed. The forward side of the nose just misses the pins 38 on the undepressed keys as the latch 54 is moved upwardly, thus preventing disengagement of the latch 54 from the driver 45 until said nose strikes the pin on the depressed key. When the nose 63 strikes the stud 38 of the depressed key, the latch 54 will be rocked counter-clockwise far enough to remove the lip 55 from above the flange 56 of driver 45, and therefore, the driver 45 will continue its movement independently of the differentially movable disk 52. When the latch 54 is rocked counter-clockwise in this manner, an aligning arm 57 (Fig. 4) pinned to the latch 54, will come into engagement with the one of a series of notches 58 (Figs. 2 and 5) formed in a plate 64 carried by hanger 41, corresponding to the key depressed. When the latch is in this disconnected position, the flange 56 coacts with the right-hand edge of the lip 55, and will, therefore, hold the aligner 57 in the notch 58 and thereby maintain the differentially movable disk firmly in its set position, the flange 56 being long enough to effect this locking function when the driver reaches its uppermost position during its operation.

Also pivoted on the arm 53 and pinned to the latch 54 is a bell crank 59 which, at its upper end carries a pin 60 adapted to co-operate with a flange 61 projecting laterally from a bar 62 supported by the hanger 41. As the differentially movable disk moves upwardly, the pin 60 will be on the outside of the flange 61, and will therefore, prevent the latch 54 from being rocked in a clockwise direction. The further functions of this bell crank 59 will be described in connection with the totalizing operation. The movement of the latch 54 is limited by a pin 70 carried by the differentially movable disk 52 and which projects into a notch 71 of the latch 54.

In case no key in a bank is depressed, it is necessary to disengage the latch 54 from the flange 56 in the zero position of the parts, and to accomplish this function the following mechanism is provided. Fast on a shaft 72 (Figs. 2 and 3) carried by the key frame 34, is an arm 73, which at its upper end carries a pin 74. This pin normally lies in the path of the latch 54 and when the differentially movable disk is given its clockwise movement with no key in its corresponding bank depressed, the nose 63 of the latch 54 will strike the pin 74, and rock the latch counter-clockwise and thus disconnect the differentially movable disk from the driver 45 in the zero position. If, however, a key is depressed, the detent 39 (Fig. 3) is lowered. This detent at its lower end is pivoted to an arm 75 which in turn co-operates with a pin 76 carried by an arm 77 fast on the shaft 72. It can be seen that when the detent 39 is lowered, the arm 75 will be rocked clockwise, which, through the pin 76 and arm 77, will rock the shaft 72 and arm 73 counter-clockwise far enough to remove the pin 74 from the path of the latch nose 63, thereby permitting the differentially movable disk to be carried upwardly so that the latch may be disconnected in the position corresponding to the key depressed.

When the zero stop member 73 is moved to its ineffective position upon depression of a key, the pin 74 (Fig. 3) carried thereby is so positioned that the forward edge of the nose 63 (Fig. 4) will engage the pin 74 as the latch moves upward. Thus the pin 74 acts as a means for maintaining the latch in engagement with the driver in exactly the same manner as the pins 38 of the keys 30.

Means are provided for returning the differentially movable disk to its zero position at the end of every operation of the machine. This means consists of a pin 103 (Figs. 2 and 4) carried by the disk 52 and projecting into the path of an upwardly extending arm 104 of the driver 45. When the driver 45 is returned to its normal position, its arm 104 will come into contact with the pin 103 and return the differentially movable disk to zero.

*Indicators*

Pivoted at 80 (Figs. 2 and 4) to the differentially movable disk 52 is a beam 81 connected at its opposite end by a link 82 to a lever 83 loosely mounted on a shaft 84 supported by the machine side frames. Each of the levers 83 is provided with a segment having alining teeth 85 on its periphery. These teeth are adapted to be engaged by an alining bar 86 carried by a plurality of arms 87 fast on a shaft 88. This alining bar 86 is normally in engagement with the teeth 85 and is disengaged therefrom for a sufficient length of time to enable the levers 83 to be set differentially, whereupon the bar 86 is once more engaged with the teeth 85 to properly aline the parts. This alining means can readily be operated by any suitable mechanism, and as it forms no part of the present invention, no means for operating it is shown herein.

Fast to each of the levers 83 is a segment 89 carrying a beveled rack segment 78 adapted to co-operate with a bevel pinion 90 fast on the lower end of a vertically extending shaft 91 supported by a frame 92. At its upper end the shaft 91 carries a cylindrical indicator 93 carrying indicia adapted to be displayed through openings 94 in the cabinet.

When the differentially movable disk 52 is given its clockwise movement, the left hand end of the beam 81 is carried therewith and set in a differential position corresponding to the key depressed. At the same time, a roller 91, carried by the actuating arm 48, comes into contact with the lower edge of the beam 81 and moves the right hand end of the beam to the position corresponding to the key depressed. This adjustment of the beam is an old and well known method for setting indicators and it is not believed that any further description thereof is necessary here.

Also pinned to the lever 83 is another segment 100 which is adapted to co-operate with a pinion 101 fast on one of a plurality of shafts 102 supported by the machine side frames. By means of these shafts 102 and pinions, such as the pinion 101, the differential setting given to the indicator is transferred to a duplicate indicator which will be exposed through an opening in the rear of the cabinet in a manner well known in the art. These shafts 102 may also be used to set up printing wheels in a printer which may be located on either end of the machine but which is not shown herein, as it forms no part of this invention.

Totalizers

There are three lines of totalizers in the present machine, each of said lines carrying four totalizers. The totalizer wheels are arranged in groups, each group consisting of wheels of the same denomination. In order to select any particular totalizer, the entire totalizer line is slid longitudinally of the machine to a position in which the appropriate wheel in each group will be opposite the actuators. This machine is constructed so that all three of the totalizer lines will be engaged on every adding operation. However, if a key in only one of the transaction banks is depressed, the totalizer lines corresponding to the other two transaction banks will be in a blank position or will be moved to a blank position, that is, a position in which there are no totalizer wheels, so that even though they are given an engaging movement they are not actuated. As the three totalizer lines are substantially the same, the description of one of them is thought to be sufficient. As seen in Fig. 9, there are six groups of totalizer wheels 110, each group comprising four totalizer wheels. This construction provides four totalizer wheels corresponding to the four amount banks and two overflow wheels so that a total greater than the capacity of the keyboard can be accumulated. The totalizer wheels of each line are loosely mounted upon a shaft 111 carried by arms 112 and 113 fast on a shaft 114 which is, in turn, rotatably mounted in the machine side frames.

Totalizer actuators

The differentially movable disk 52 for each bank carries three segmental racks 131 slidably mounted on two pins 132 projecting from said disk (Figs. 4, 5, 6, 7 and 8). These racks are moved differentially with their appropriate disk 52 and are adapted to be stopped one space short of their actuating disks 52 when no transfer is to be effected as will be fully described later.

The selected totalizers are moved into engagement with the racks 131 at the proper time during an operation and the totalizer wheels are rotated by them to an extent corresponding to the amount keys depressed.

Totalizer selecting mechanism

Figure 13:
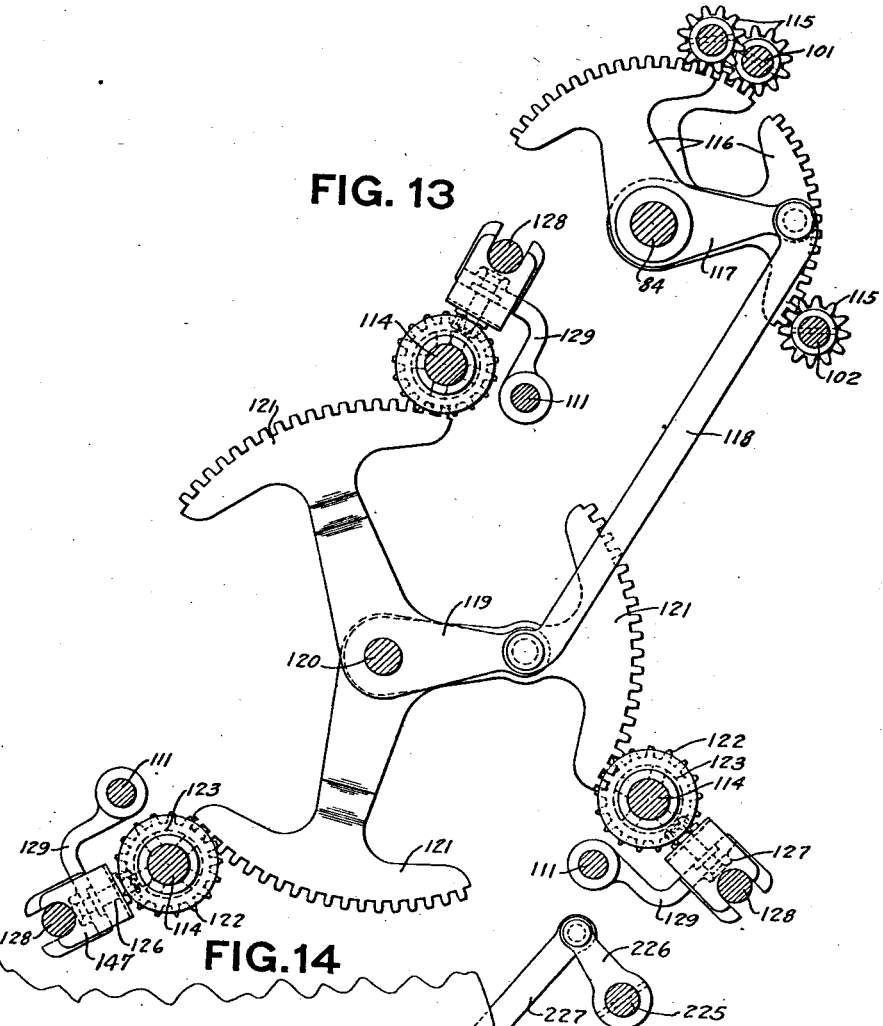
Fig. 13 shows the totalizer-selecting mechanism.

As is well known in machines of this type, the totalizers are selected by shifting the entire line laterally of the machine so as to bring the same totalizer wheel in each of the groups into alinement with the actuator, and the mechanism for accomplishing this movement will now be described. It will be recalled that the selection of the totalizers is under the control of the three banks of control keys. The control banks are provided with differential mechanism which operates in the same manner as the differential mechanism for the amount banks, with the exception that the control bank differential mechanism does not have any totalizer actuating racks in connection therewith. Each control bank differential mechanism, however, is provided with a beam, such as the beam 81, connected by a link 82 and a lever 83 to a segment 100 which, through the pinion 101 and shaft 102, or a like pinion on any of these shafts, will transfer the differential movement of the control bank to a pinion 115, (Fig. 13) also fast on one of the shafts 102. This pinion meshes with one of three segments 116 loosely mounted on the shaft 84 above mentioned. Integral with each of the segments 116 is an arm 117 which is connected by a link 118 to an arm 119 loose on a stud 120 projecting from the left hand side frame. Integral with each of the arms 119 is a segment 121, one for each of the three totalizer lines. These segments are normally in mesh with and are adapted to rotate pinions 122 (Figs. 10 and 13) loosely mounted on the left hand ends of each of the shafts 114. Secured to the pinions 122 are drum cams 123 which have cam slots 124 (Fig. 10) formed in their peripheries. These cam slots 124 co-operate with rollers 125 carried by rods 126 mounted in yokes 127 which straddle shafts 128 supported in the machine side frames. Each of these yokes 127 has an inwardly projecting arm 129 through which the left hand end of each of the shafts 111 projects. The movements of the shafts 111 with the yokes 127 is insured by means of shoulders formed on the shafts 111 and collars 130 pinned to the ends thereof, between which the arms 129 are located.

When one of the control keys is depressed and the differential mechanism for its appropriate bank is operated, the differential movement imparted to the differentially movable disk of this bank will be transmitted by means of the beam 81, link 82, lever 83, segment 100, pinion 101, shaft 102, pinion 115, segment 116, arm 117, link 118, and arm 119 to the appropriate one of the three segments 121. This segment will thereby be given a movement corresponding to the key depressed, and through the pinion 122 will rotate the drum cam 123 a pre-determined distance. The rotation of the drum cam 123 by means of the cam slot 124 will slide the roller 125, yoke 127 and totalizer shaft 111 a distance corresponding to the control key depressed, which will position the selected totalizer in the same vertical plane as the actuating racks 131. When, therefore, the totalizers are engaged with the actuators, and the actuators moved, the wheels of the selected totalizer will be rotated to an extent corresponding to the values of the amount keys which have been depressed.

*Totalizer engaging mechanism*

As above stated, all these totalizer lines are moved to engaging position on every operation of the machine regardless of which of the control keys are depressed. The mechanism provided for this purpose will now be described.

Figure 14:
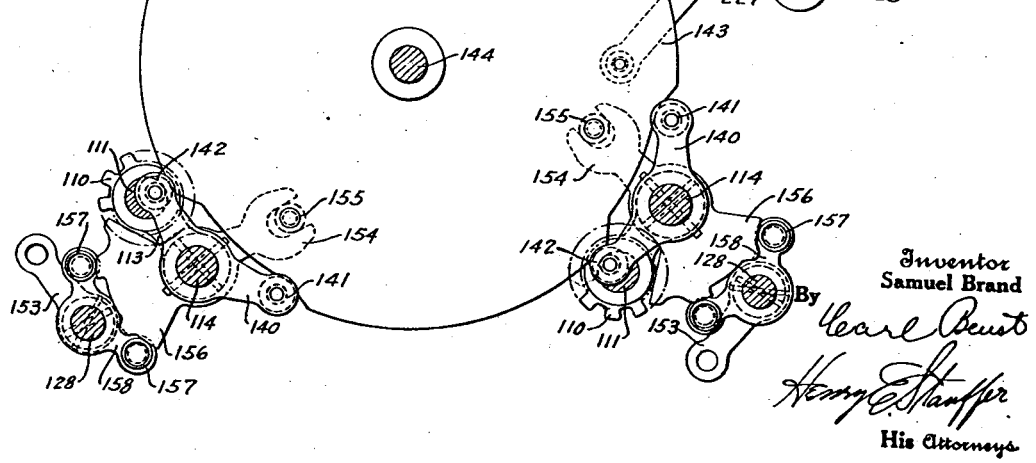
Fig. 14 shows the totalizer engaging mechanism and the totalizer wheel aliner disengaging mechanism.

A lever 140 (Figs. 10 and 14) is fast on the right hand end of each of the shafts 114. This lever carries rollers 141 and 142 which co-operate with the periphery of a large cam disk 143 loosely mounted on a stud 144 carried by the right hand side frame. In Fig. 14 the parts are shown in their normal disengaged positions. It is evident however that if this cam disk is given a short clockwise movement, the cam edges on the periphery thereof will cause all three of the levers 140 to be rocked clockwise. The arms 112 and 113 are also fast to shaft 114, and therefore, the shaft 111, carried by said arms, will be moved bodily towards the center of the machine so as to engage the selected totalizers with the actuators.

The mechanism whereby the cam disk 143 is rocked clockwise and then counter-clockwise in order to engage and disengage the totalizers with the actuators is only partially shown herein. It is completely shown in the Fuller patent above mentioned. In this patent a three-armed spider is connected through a link and lever (not shown) to a shaft similar to the shaft 225 shown herein. Also fast on this shaft 225 is a lever 226 connected to the disk 143 by a link 227. The spider is oscillated by means shown in the patent and through the above described connections will rock the disk 143. This means for moving the disk is only illustrative as any suitable mechanism could be used for this purpose.

*Totalizer alining mechanism*

The totalizer elements on each totalizer line are alined when in their normal disengaged positions, by an alining bar 150 (Figs. 2, 5 and 9) carried by two pairs of yoked arms 151 pivotally mounted on two rods 152. As seen in Fig. 2, one arm 152, of each pair of arms 151, is bifurcated and straddles the shaft 111. Fast on each shaft 128 are two arms 153 which support the rods 152 so that the rods may be slid through these arms.

Just as the totalizers are moved into engagement with the actuators, the shaft 128 for each line is rocked clockwise (Fig. 2) by means to be later described. Upon this clockwise movement of the shaft 128 the arms 153 move the arms 151 with the shaft 111 and thereby move the alining bar 150 with the totalizer wheels until said wheels are in engagement with the actuators. The shaft 128 is then rocked counter-clockwise to withdraw the aliner from engagement with the totalizer wheels and permit said wheels to be adjusted.

Near the end of the operation, the shafts 128 are given a clockwise movement (Fig. 2) which will reengage the alining bar with the totalizer elements before they move out of engagement with the actuators whereupon both wheels and actuators are moved out together to normal position.

The means for giving the shafts 128 the above mentioned oscillations will now be described. Identical mechanisms are provided for the three totalizer lines, and therefore, the mechanism for one line only will be described. Loose on the shaft 114 is a lever 154, (Fig. 14), one end of which is bifurcated and co-operates with a pin 155 carried by the totalizer engaging cam disk 143 (Figs. 10 and 14). At its opposite end the lever 154 has a segmental arm 156, the periphery of which has high and low spots formed thereon. Co-operating with this periphery are two rollers 157 carried by a lever 158 fast on the shaft 128.

It can be seen that when the cam disk 143 is rocked clockwise to engage the totalizers the pins 155 will rock the levers 154 counter-clockwise. This movement will reverse the positions of the rollers 157 with relation to the high and low spots on the segment 156, which will rock the lever 158 and shaft 128 clockwise. As above described, this will cause the alining bar 150 to follow the totalizer wheels as they move into engagement with the actuators. The continued movement of the plate 156 will then rock the aliner clockwise to move it out of engagement with the totalizer wheels. Just before the totalizer is rocked out, the aliner is again moved into engagement therewith and when the totalizer returns to its disengaged position the aliner moves with it to the position shown in Fig. 14.

An additional alining mechanism is also provided. The rod 126 (Fig. 10) is supported by the yoke 127 and projects through a yoke 147, which is bifurcated and straddles shaft 128. This yoke 147 has an arm on each side of the yoke 127 and serves to maintain the roller 125 in engagement with groove 124. When the drum cam 123 is rotated to select a totalizer and, through the roller 125, shifts the yoke 127 and its corresponding totalizer line to a selected position, one of a plurality of holes 159 drilled in the groove 124 is positioned opposite the rod 126. Then when the totalizer is moved into engagement, the yoke 127 will be carried with it and, as the rod 126 is carried by the yoke 127, the rod will move inwardly into its appropriate hole 159. It is evident that any lateral movement of the totalizer line is prevented during such engagement. The parts are returned to disengaged positions when the totalizer is withdrawn from engagement with its actuators.

Transfer mechanism

Mechanism is provided for transferring from lower to higher denominational orders. Each totalizer wheel 110 has secured thereto a disk 160 (Figs. 8, 11 and 12), which has a single long tooth projecting from its periphery in the zero position of the totalizer wheel. As additions are made the totalizer wheels are driven in a clockwise direction (Figs. 6, 7 and 8) and when a wheel passes from "9" to "0" the long tooth on disk 160 contacts an arm 161 fast on a shaft 162 supported by the differential hanger for the differential unit of next higher order and rocks said arm and shaft counter-clockwise. Also fast on the shaft 162, adjacent said next higher unit is an arm 163 which carries a pin 164 having a flattened side engaging a shoulder 165 formed in a slot 166 in a transfer lever 167 (Fig. 8). This lever is pivoted at 168 on the differential hanger. The arm 163 and lever 167 are pulled toward each other by a connecting spring 169. It can readily be seen from Fig. 8 that when the long tooth on the disk 160 of next lower order, rocks the arm 161, shaft 162 and arm 163 counter-clockwise, the pin 164 will be moved off of the shoulder 165, in the slot 166 of lever 167, and this lever will be rocked clockwise by spring 169 assisted by the camming action of the slot 166 and pin 164 until the pin 164 rests in the upper end of slot 166 as shown in Fig. 7.

It will be recalled that the totalizer actuating racks 131 are slidably mounted on the pins 132. Pivoted on the right hand one of these pins 132 (Fig. 8) is an arm 170. A pin 171 carried by the differentially movable disk 52 projects through a slot 172 in the arm 170 and prevents lateral movement thereof. The rack 131 has a downwardly extending arm which carries a pin 173 projecting through a notch 174 in the arm 170. The arm 170 also carries a roller 175 which rolls over the periphery of a ring 176 carried by one of the differential hangers.

Fig. 8 shows the differential disk 52 and the actuating rack 131 in their farthest positions of adjustment just before "9" is to be added to the totalizer wheel. If upon this return movement of the disk and rack to normal positions, the totalizer wheel of next lower denomination does not pass from "9" to "0" then no transfer is to be made, the arm 163 will not be tripped, and therefore the lever 167 will not be lowered. The differentially movable disk 52 is positively moved in a counter-clockwise direction on its return movement, and will be later described and the arm 170 is carried therewith due to the pin 173 and notch 174 in said arm 170. The same relative positions as shown in Fig. 8, will be maintained between the disk 52, rack 131 and arm 170 during all of this movement; except the last step, due to the fact that the roller 175 rolls along the periphery of the ring 176.

As the parts approach their zero positions, the roller 175 will come to a notch 177 in the ring 176. At the same time, the pin 173 comes into contact with a nose 178 on the lever 167, thus stopping the rack 131 in its zero position. The differentially movable disk, however, moves one step farther to reach its home position. During this one step of movement of the disk 52, the pins 132 are moved into the left ends of the slots in the rack 131. The arm 170 is thus rocked counter-clockwise with the pin 173 as the pivot and the roller 175 enters the notch 177 in the ring 176. These parts are now in the positions shown in Fig. 6 and no transfer has been made.

When, however, the totalizer wheel of next lower order passes from "9" to "0" on an adding operation, the arm 163 is tripped by the long tooth of the disk 160 and the lever 167 is rocked clockwise to the extent permitted by the slot 166 in said lever. In this case, as the differential disk approaches its normal position the roller 175 will be prevented from entering its notch in the ring 176, by the engagement of a depending foot 179 of the arm 170 with a pin 180 carried by the lever 167, as shown in Fig. 7. The foot 179 of the arm 170 is so shaped that just before the roller 175 reaches the notch 177, one end of the foot 179 engages the stud 180. As the parts move on toward their home positions, the arm 170 is guided by the stud 180. Also, on this operation, the nose 178 on the lever 167 is lowered out of the path of the pin 173 on the rack 131. The disk 52, rack 131, and arm 170, therefore, are maintained in the relative positions shown in Fig. 7 until the differentially movable disk 52 reaches its home position. The rack 131 is, therefore, moved an extra step to the position shown in Fig. 7, which will give an additional unit of movement to its appropriate totalizer wheel.

Each of the drivers 45 carries three pins 181 (Fig. 2), which project through slots 182 in the left hand hanger 41 of each differential unit, and co-operate with the levers 167 of the next adjacent bank. On the clockwise movement of the driver 45 the pins 181 will contact the levers 167, and restore any of these levers which had been tripped, by the previous operation, to their untripped positions in which the pins 164 again engage the shoulders 165 where they are held under the influence of springs 169.

Totalizing operation

Totalizing operations may be divided into two classes; first, totalizing proper, in which operation the totalizing wheels are returned to zero, the amount standing thereon printed, and the wheels left in their zero positions. The second form of totalizing is known in the art as sub-totalizing. In this operation the totalizer wheels are returned to zero, the amount standing thereon is printed, and the wheels are then returned to their original positions so that continued additions may be made. The period of time during which the totalizer wheels are in engagement with the actuators is the deciding factor as to whether a total or sub-total will be printed.

This machine is given two cycles of operation during totalizing. The first cycle is for the purpose of resetting any transfer levers 167 which had been tripped during the last preceding operation and positioning the selected totalizer. This operation is very common in the art and no emphasis need be laid upon it herein.

As will be later described, the differential disks 52 are driven by the totalizer wheels in totalizing operations, and it is therefore necessary to provide mechanism for disconnecting the differential latch mechanism from the driver 45 during such an operation. This is accomplished in the following manner. Integral with the total lever 33 is the regular total lever disk such as shown in the Fuller patent and rigidly connected to this disk by a yoke 228 is a disk 190 (Fig. 16), which has a slot 191 cut therein. An arm 192 fast on a shaft 193 supported by the machine side frames carries a pin 194 which projects through the slot 191. The total lever 33 is adapted to be moved either up or down to select the totalizer line to be operated, on any totalizing operation. It is evident from Fig. 16 that any movement, either clockwise or counter-clockwise, of the disk 190 from the adding position, in which it is shown, will, due to the shape of the slot 191, rock the arm 192 counter-clockwise and thereby rock the shaft 193 to which it is fast, in the same direction. Also fast on the shaft 193 (Fig. 2) is an arm 195 which is bifurcated at its upper end and co-operates with a pin 196 carried by the downwardly extending arm of the bell crank lever 59 above mentioned. It is evident that when the shaft 193 is given its counter-clockwise movement by the total lever, as above described, the bell crank 59 will be rocked clockwise due to the co-operation of the arm 195 and pin 196. This movement of the bell crank lever 59 will rock the latch 54 also clockwise so that the lip 55 thereof will be moved out of the path of the flange 56 on the driver 45 and the pin 60 on the bell crank 59 will be moved to a position behind the flange 61 of bar 62. During the operation of the machine, when the driver 45 is moved clockwise, the flange 56 thereon passes to the left of the lip 55. It is evident from the above that the driver 45 can be moved independently of the differentially movable disk 52 and also that when the differentially movable disk is carried upwardly during the resetting movement of the totalizer wheels it will be impossible for the latch 54 to interfere in any way as the pin 60 will be behind the flange 61 and the lip 55 of the latch will be behind the flange 56, and will thereby prevent any movement of the latch 54.

It is apparent that mechanism must also be provided to move the zero stop from its normal effective position to its ineffective position on totalizing operations. Rotatably mounted in the machine side frames is a shaft 189 (Fig. 3) carrying a plurality of arms 197 which in turn support a rod 198. The arm 77 has a forwardly projecting toe 199 which normally lies just beneath the rod 198. The shaft 189 is rocked clockwise by the movement of the total lever 33 to any of its totalizing positions. The mechanism for rocking this shaft is not shown herein, as it forms no part of this invention, but it may be seen if desired in the patent above referred to. Upon the clockwise rocking of the shaft 189 the rod 198 will engage the toes 199 for each bank and rock them counter-clockwise. As the arms 77 and the zero stop arms 73 are both fast upon the shaft 72, the zero stop arms 73 will all be rocked counter-clockwise to their ineffective positions. When the total lever is returned to its adding position, the parts will reassume the positions shown in Fig. 3.

Resetting keys

There are three totalizer lines in this machine, each line carrying four totalizers. The shaft 111, upon which each line of totalizers is mounted has a longitudinal groove cut therein in which is a key or spline 200 (Figs. 6 and 9). This key is slidable endwise in the groove in the shaft 111 and has two positions of adjustment, its adding position and its totalizing position. During adding operations, the key is inactive and is held against movement, as the shaft 111 is not rotated.

When a totalizing or sub-totalizing operation is to be effected, the key 200, appropriate to the line upon which the totalizer to be reset, is located, will be moved from its adding to its totalizing position. This selection and movement of the keys in their slots in the shafts 111 is accomplished by the movement of the total lever 33. As can be seen from Fig. 1, the total lever has three positions of adjustment above its adding position for sub-totalizing, and three positions below its adding position, for totalizing. If the total lever is moved to its first position, either above or below its adding position, the key 200 for the upper totalizer line will be moved to its totalizing position. If the total lever is moved to its second position above or below adding, the key of the front totalizer line will be adjusted to its totalizing position, and if the total lever be moved to its third position above or below its adding position, the key appropriate to the back totalizer line will be moved to its totalizing position. This adjustment of the keys is accomplished in the following manner. The total lever disk 190 has a peripheral flange 201 formed thereon (Figs. 15 and 16) in which are three differently shaped cam slots 202. Co-operating with each of these cam slots 202 is a roller 203 carried by a right-angled flange 204, of an arm 205 fast to a hub 206 slidably mounted on its corresponding shaft 114. The arm 205 surrounds the shaft 111 and engages a notch 207 (Fig. 9) formed in the key 200. It is evident from the shape of the slots 202, as shown in Fig. 15, that, as the total lever is moved up and down from its adding position, the arms 205 will be slid successively a short distance to the right, and then back to their normal positions, as seen in Fig. 10. That is if one of the clerk's totalizers is to be reset, the total lever will be moved to its first position below adding position. This will move the arm 205 and key 200 for the upper totalizer line from their normal positions to their totalizing positions. If the next operation is to take the total of a department, the lever would be moved to its second position below normal position, and this movement would return the arm 205 and key 200 for the upper totalizer line to its ineffective position and at the same time would move the arm 205 and key 200 for the front totalizer line, which carries the department totalizers, to their totalizing positions.

After the key 200 appropriate to the desired totalizer line is positioned in its totalizing position it is necessary to depress the control key in the control bank appropriate to the selected totalizer line in order to select the proper totalizer for operation. This is accomplished in the same manner as in adding operations and therefore no further description thereof will be given at this point.

After the desired totalizer is positioned for operation and the key 200 appropriate to that particular line is moved to its totalizing position the shaft 111 and the key 200 for this particular line are rotated first counter-clockwise, as seen in Fig. 6, and then clockwise to their normal positions.

If a sub-total is to be taken the totalizer is left in engagement with the racks and when the racks are returned to zero in the usual manner the amount taken from the totalizer will be returned thereto.

Each of the totalizer elements 110 carries on its inner periphery a lug 208 (Figs. 11, 12 and 18).

The shafts 111 are formed with a plurality of circumferential ribs 217 which carry the totalizer wheels. Each totalizer wheel rests upon two of these ribs, as shown in Fig. 18. This construction leaves sufficient space for the lug 208 to extend between the two ribs appropriate to each totalizer wheel. As the totalizer wheels are rotated in adding operations these lugs will assume various positions about the shaft 111. The keys 200 carry projections 209 (Fig. 9) one for each group of wheels, which when the key is moved to its totalizing position are brought into the plane of the racks 131. The selected totalizer is also slid into this same plane. When the parts are in the positions above described the shaft 111 and key 200 appropriate to the selected totalizer line will be rotated, and therefore, the projections 209 on the keys will move between the ribs 217 and contact the lugs 208 on the totalizer elements, thereby picking up the totalizer elements at whatever positions they may occupy and return them to their zero positions.

It will be remembered that the disk 160 appropriate to each totalizer element has a long tooth in the zero position of the totalizer element. As the totalizer wheels arrive at zero, the long teeth will come into contact with the ends of the above mentioned arms 161 and said totalizer wheels will therefore be stopped in their zero positions. The shaft 111 and key 200 are then rotated in the opposite direction, which will leave the totalizer wheels in their zero positions.

In totalizing operations, all three totalizer lines are rocked into engagement with the racks 131 at the beginning of an operation. The two totalizer lines which have not been selected by the depression of one of the transaction keys are in their normal positions, in which there is no totalizer wheel opposite the racks 131 and therefore only the selected totalizer will be operated. As the selected totalizer wheels are in engagement with the racks 131 corresponding thereto, these racks will be driven by the totalizer wheels as they are returned to their zero positions, which will differentially position the racks and the differentially movable disks 52 in accordance with the amount which previously stood on the totalizer wheels. This differential setting will be transferred to the printing and indicating mechanisms in the usual manner and it is not thought to be necessary to include any further description of that mechanism herein.

In order to rotate the selected shaft 111 and its key 200 to return the totalizer wheels to their zero positions, the following mechanism is provided. Pivotally mounted on the stud 144, above described, projecting from the right hand side frame of the machine are three arms 211 (Figs. 9 and 17) which carry segment gears 212. Each of these segment gears 212 is adapted to engage a pinion 213 connected to a disk 214 by a hub 218. The hub of this disk and pinion is connected to the shaft 111 by the key 200 in such a way that the rotation of the pinion will drive the shaft 111 but will at the same time permit the shaft and key to be slid laterally through the hub. The pinion 213 is maintained in its normal position in alignment with the segment 212 by a collar 215 fast on the shaft 114. This collar has two flanges 216 which co-operate with the pinion 213, there being one flange on each side of said pinion. It is evident that this construction will permit the rotation of the pinion but will prevent endwise movement of the pinion when the shaft 111 is slid to select a totalizer. The pinion 213 is held in alinement by the regular totalizer aliner 150 which extends to the right, as seen in Fig. 9, far enough to co-operate with a notch cut in the disk 214.

It is of course understood that only one totalizer can be reset during a single operation. Any suitable selecting mechanism therefor may be included in the organization of the present machine for selecting which of the segment gears 212 is to be operated in order to rotate the shaft 111 and key 200 for the purpose of resetting the totalizer wheels. This mechanism is not included herein, as it forms no part of this invention, and any suitable form of selecting mechanism may be used.

At the beginning of a totalizing operation the parts are in the positions shown in Fig. 6. In such an operation the power is applied to the rack 131 and the differentially movable disk 52 through the totalizer wheel. The roller 175 on the arm 170 is in the notch of ring 176 and it is impossible for the rack to pull this roller out of the notch 177 as the force is applied at right angles to the inclined surface leading into the notch 177.

It is therefore necessary to provide means for moving the differentially movable disk 52 a sufficient distance to place the roller 175 on the periphery of ring 176.

The differentially movable disk 52 has a roller 219 (Figs. 2 and 4) mounted on its side which roller is in the same vertical plane as the arm 48 which operates the driver 45. As this arm rocks counter-clockwise a cam edge 220 formed thereon will come into contact with the roller 219, raise this roller and rock the differentially movable disk clockwise far enough to remove the roller 175 from the notch 177. From this point the movement of the differentially movable disk can be continued by the backward rotation of the totalizer wheel.

Another reason for providing the roller 219 and cam edge 220, is to move the disk 52 and the rack 131 into zero position before the totalizer wheel is moved into engagement with said rack. When the machine is adjusted for total taking operations, the latch 54 is moved to ineffective position, in the manner hereinbefore described, and therefore, the driver 45 cannot move the differential disk 52. Before the totalizer wheel is engaged with the rack, the cam edge 220 strikes the roller 219 and moves the disk 52 and the actuator to the "zero" position. Then when the totalizer wheel is engaged with the rack and the totalizer is rotated to set the disk 52, and through the disk 52 and beam 82, sets the type wheel and indicator, the proper amount is set up. The reason for this preliminary movement is better understood if it will be assumed that the totalizer wheel is setting at "zero" and a totalizing operation is to be performed. With the totalizer at "zero", the totalizer wheel does not rotate during a total taking operation, since the lug 208 is already in the "zero" position. When the disk 52 is in normal position, the beam 81 is set to control the type wheel and indicator so that they set in the "blank" position, and therefore nothing would be printed, even though the totalizer wheel sets at "zero", if it were not for the roller 219 and cam edge 220 which moves the disk 52 to the "zero" position thus setting the type wheel and indicator to "zero".

Now assuming another example in which the totalizer wheel stands at "1", and the machine is operated for totalizing, then the totalizer wheel moves the rack one step. This would adjust the beam 81 one step out of normal, which would be the "zero" position, and a "0" would be printed instead of a "1" were it not for the movement imparted to the rack by the cam 200 and rollers 219.

From this it is seen that this cam edge 220 and roller 219 moves the rack 131 and disk 52 to a proper relation with the totalizer pinion during totalizing operations, before the totalizer wheel is rocked into engagement therewith, so that the correct amount is set up on the type wheels and indicators.

This cam surface will also move the pin 173 out of the path of the surface 178 so that the transfer arm can be restored.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of an actuator, a driving member therefor, a laterally extending flange on said member, a latch carried by said actuator and adapted to cooperate with said flange to transmit the movement of said driving member to said actuator, value determining means for shifting the latch in one direction to disconnect the latch from the flange in different positions, said flange adapted to maintain the latch in its disconnected position, and a manipulative means for shifting the latch in another direction out of normal to disconnect the latch from the driver, said flange adapted to maintain the latch in the second named shifted position during the operation of the driver.

2. In a machine of the class described, the combination of an actuator, a driving member therefor, a laterally extending flange on said member, a latch on said actuator, a laterally extending element on said latch normally cooperating with said flange to transmit the movement of said driving member to said actuator, value determining means for shifting said element in one direction to disconnect the element from the flange in different positions, said flange being adapted to maintain the latch in its disconnected position, and a manipulative means for shifting the element in another direction out of normal to disconnect the element from the flange, said flange being adapted to maintain the latch in the second named position during the operation of the driver.

3. The combination of a driving member, a differentially movable member, a latch connecting said members, a plurality of depressible keys, and latch-disconnecting means operatively connected to said latch and cooperable with undepressed keys to maintain the effectiveness of said latch.

4. The combination of a driving member, a differentially movable member, a latch connecting said members, a plurality of depressible keys, and a latch-disconnecting member adapted to bear against undepressed keys to prevent disabling of the latch mechanism and adapted to be actuated by a depressed key to disable the latch.

5. The combination of a driving member, a differentially movable member, a latch connecting said members, a plurality of depressible keys, and a latch-disconnecting member provided with an edge cooperable with undepressed keys to maintain the latch in effective position and with another edge cooperable with a depressed key to disable the latch.

6. The combination of a driver, a differentially movable actuator driven thereby, a latch connecting said driver and actuator, a plurality of depressible keys, pins on said keys, and a latch-disconnecting member simultaneously cooperable with pins of adjacent undepressed keys to maintain the latch in effective position.

7. The combination of a driver, a differentially movable actuator driven thereby, a latch connecting said driver and actuator, a plurality of depressible keys, pins on said keys, and a latch-disconnecting member simultaneously cooperable with pins of adjacent undepressed keys to maintain the latch in effective position and cooperable with the pin of a depressed key to render the latch ineffective.

8. The combination of a driver, a differentially movable actuator driven thereby, a latch connecting the actuator to the driver, a plurality of depressible keys, a zero stop member movable to ineffective position upon depression of a key, and means cooperable with said zero stop member when the zero stop member is in its ineffective position and with the undepressed keys successively when said means is moved past the undepressed keys for maintaining said latch in effective position during such movement.

9. The combination of a driver, a differentially movable actuator driven thereby, a latch connecting the actuator to the driver, a zero stop member, and means connected to said latch and cooperable with the zero member when the zero stop member is in an effective position to disconnect the latch, and cooperable with the zero stop member when the zero stop member is in an ineffective position to maintain the latch in its effective position.

10. The combination of a differentially movable actuator, a driver therefor, a latch connecting said actuator and driver, a plurality of depressible keys, guiding means, and means cooperable with undepressed keys and said guiding means for maintaining the latch in latching position.

11. The combination of a differentially movable actuator, a driver therefor, a latch connecting said actuator and driver, a plurality of depressible keys, a guiding flange, and means cooperable with undepressed keys and said guiding flange for maintaining the latch in latching position.

12. In a cash register, the combination of differential latch mechanism comprising a latching member and a disabling member, said members being secured together to move as a unit, a manipulative device for adjusting the machine for a certain class of operations, said device being adjustable only prior to an operation of the machine, and means adjusted by the manipulative device and cooperating with said disabling member for disabling the latch mechanism for said certain class of operations.

13. In a cash register, the combination of differential latch mechanism comprising a latching member and a disabling member, said members being secured together to move as a unit, and means cooperating with said disabling member for rendering the latch mechanism ineffective on totalizing operations.

14. In a cash register, the combination of differential latch mechanism comprising a latching member and a disabling member, said members being secured together to move as a unit, a pivoted lever having an adding position and a plurality of totalizing positions, and connections between said lever and said disabling member for disabling the latch mechanism when the lever is moved to a totalizing position.

15. In a machine of the class described, the combination of differential latch mechanism comprising a latching member and a latch-disconnecting member, said members being secured together to move as a unit, and means cooperating with said latch-disconnecting member for preventing the disabling of said latch after the movement thereof has begun.

16. The combination of a differentially movable actuator, a driver therefor, a latch connecting the actuator and driver, a total lever, and means for disconnecting said latch by a movement of the total lever.

17. The combination of a differential actuator, a driver therefor, a latch connecting the actuator and driver, a total control means for moving the latch into ineffective position, and a guide for holding the latch in ineffective position as the actuator is moved during an operation of the machine under control of said total control means.

18. In a machine capable of accumulating and total-taking operations, the combination of a totalizer, a differential actuator, a driver therefor, a latch connecting the actuator and driver for moving the actuator during accumulating operations, means for controlling the machine for total-taking operations, means controlled thereby for moving the latch to ineffective position, and means also controlled by said controlling means for driving the actuator from the totalizer.

19. In a machine capable of accumulating and total-taking operations, the combination of a totalizer, a differential actuator, a driver therefor, a latch connecting the actuator and driver for moving the actuator during accumulating operations, means for controlling the machine for total-taking operations, means controlled thereby for moving the latch to ineffective position, means also controlled by said controlling means for driving the actuator from the totalizer, and means for guiding the latch in an ineffective path as the actuator is moved under control of the totalizer.

20. The combination of a differentially movable actuator having a zero position and a home position beyond its zero position, a driver for moving the actuator differentially, a latch connecting said driver and actuator, and an operating means directly cooperable with said actuator to move it from home to zero position, and directly cooperable with said driver to move the actuator differentially from zero position.

21. The combination of a differentially movable actuator having a zero position and a normal home position, a cam for shifting said actuator from home position to zero position, and means for operating said cam invariable extents.

22. The combination of a differentially movable actuator, a driver therefor provided with a slot, a latch connecting the actuator to the driver, an operating member, means on said member cooperating with the slot in said driver to actuate the same to move the actuator differentially, a cam on said operating member, and means on said actuator with which said cam cooperates to move the actuator constant extents.

23. The combination of actuators having normal home positions and positions corresponding to the digits, and means for moving the actuators from home to zero positions simultaneously, and from zero to other digital positions dissimultaneously.

24. The combination of a differentially movable actuator having home and zero positions, a totalizer, means for driving the actuator from the totalizer, and means for moving the actuator from home to zero position.

25. The combination of a plurality of differentially movable actuators, slotted drivers therefor, operating arms for said drivers arranged in a line, and pins on said arms arranged spirally to cooperate with said slots to effect successive movements of said drivers and actuators.

26. The combination of a differentially movable actuator, a driver therefor, a plurality of value determining means, a latch to connect the driver and the actuator, said latch having a normal intermediate position and adapted to be shifted in opposite directions from its normal position to become ineffective, means controlled by an actuated value determining means to shift the latch in one direction to one of its ineffective positions, and an adjustable means to shift the latch in the opposite direction to another of its ineffective positions.

27. In a machine of the class described, the combination of a totalizer, an actuator to enter amounts into the totalizer, said actuator being normally in a position below the zero position, resetting mechanism for the totalizer, means for engaging the totalizer with the actuator for a reset operation during which operation the amount is set up on the actuator by the totalizer, and means for moving the actuator from normal to zero position prior to the engagement of the totalizer with the actuator.

28. In a machine of the class described, the combination of a totalizer, an actuator to enter amounts into the totalizer, said actuator being normally in a position below the zero position, resetting mechanism for the totalizer, means for engaging the totalizer with the actuator for reset operations during which operations the amount is set up on the actuator by the totalizer, an oscillating arm operable prior to the engagement of the totalizer with the actuator, and a projection on the actuator in the path of the oscillating arm whereby the arm moves the actuator from normal position to zero position.

29. In a machine of the class described, the combination with an actuator; and a driving member therefor; of a laterally extending flange on the driving member; a shiftable latch on the actuator engaged by the flange to enable the driver to advance the actuator; value-determining means settable into the path of the latch at different points in its advance, to shift the latch in one direction and disconnect it from the flange; and a manipulative means to shift the latch in the opposite direction to disconnect it from the flange; the flange adapted to maintain the latch in either of its disconnected positions.

30. In a machine of the class described, the combination with an actuator; and a driving member therefor; of a latch to connect the actuator and its driving member, and shiftable in opposite directions from its normal intermediate position; and devices manipulative at will to effect the shifting of the latch in one direction or the other to disconnect the actuator from its drive member.

31. In a machine of the class described, the combination with an actuator; and a driving member therefor; of a latch to connect the actuator and its driving member, and shiftable in opposite directions from its normal position; and means to effect the shifting of the latch in either direction from its normal position.

32. In a machine of the class described, the combination with an actuator; and a driving member therefor; of a shiftable latch to connect the actuator and the driving member, the latch being shiftable outwardly and inwardly from its normal intermediate position, to disconnect the actuator and its driving member; and means operable at will to determine the direction in which the latch shall shift.

33. In a machine of the class described, the combination with an actuator; and a driving member therefor; of a shiftable latch to connect the actuator and the driving member; the latch normally shiftable in one direction to disconnect the actuator from its drive member; and means effective to shift the latch in the opposite direction to also disconnect the actuator from its drive member.

34. In a machine of the class described, the combination with an actuator; and a driving member therefor; of a shiftable latch to connect the actuator and the driving member, the latch being shiftable in opposite directions from its effective position, to disconnect the actuator and its driving member; and a single means to detain the latch in whichever of its ineffective positions it has assumed, irrespective of the direction in which it is shifted to such ineffective position.

35. In a machine of the class described. the combination with an actuator; and a driving member therefor; of a shiftable latch to releasably connect the actuator and the driving member; means effective to control the shifting of the latch to one or another of its released positions to disconnect the actuator and its drive member; and means to retain the latch in either of its released positions.

36. In a machine of the class described, the combination with an actuator; and a driving member therefor; of a shiftable latch to releasably connect the actuator and the driving member; means effective to control the shifting of the latch to one or another of its released positions to disconnect the actuator and its drive member; and a single means to retain the latch in either of its ineffective positions.

37. In a machine of the class described, the combination with an actuator; and a driving member therefor; of a latch shiftable to a position to connect the actuator and driving member, and shiftable to a plurality of other positions to disconnect the actuator and driving member.

38. In a machine of the class described, the combination with an actuator; and a driving member therefor; of a latch shiftable to a position to connect the actuator and driving member, and shiftable to a plurality of other positions to disconnect the actuator and driving member; and means to determine in which direction the latch shall shift to disconnect the actuator and driving member.

39. In a machine of the class described, the combination with an actuator; and a driving member therefor; of a latch shiftable to a position to connect the actuator and driving member, and shiftable to a plurality of other positions to disconnect the actuator and driving member; means to determine in which direction the latch shall shift to disconnect the actuator and driving member; and means to retain the latch in ineffective position irrespective of the direction in which it shifted to such ineffective position.

In testimony whereof I affix my signature.
SAMUEL BRAND.